(12) United States Patent
Fukui (10) Patent No.: US 9,188,100 B2
(45) Date of Patent: Nov. 17, 2015

(54) CONTROL APPARATUS AND CONTROL METHOD FOR HYBRID SYSTEM

(71) Applicant: Keita Fukui, Susono (JP)

(72) Inventor: Keita Fukui, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 418 days.

(21) Appl. No.: 13/670,107

(22) Filed: Nov. 6, 2012

(65) Prior Publication Data

US 2013/0116913 A1 May 9, 2013

(30) Foreign Application Priority Data

Nov. 7, 2011 (JP) ................................. 2011-243369

(51) Int. Cl.
| | |
|---|---|
| *F02D 45/00* | (2006.01) |
| *F02N 11/08* | (2006.01) |
| *B60W 20/00* | (2006.01) |
| *F02M 25/08* | (2006.01) |
| *F02D 41/00* | (2006.01) |
| *B60K 6/445* | (2007.10) |
| *B60W 50/02* | (2012.01) |
| *B60K 15/035* | (2006.01) |

(52) U.S. Cl.
CPC ............ *F02N 11/0829* (2013.01); *B60K 6/445* (2013.01); *B60W 20/00* (2013.01); *B60W 50/0225* (2013.01); *F02D 41/003* (2013.01); *F02M 25/0809* (2013.01); *B60K 15/03504* (2013.01); *Y02T 10/48* (2013.01); *Y02T 10/6239* (2013.01)

(58) Field of Classification Search
CPC ...... B60K 6/20; B60K 6/22; B60K 15/03504; B60K 2015/03571; B60Y 2200/92; F02D 41/003; F02M 25/08; F02M 25/0809; F02M 33/02; F02N 11/0814; F02N 11/0829
See application file for complete search history.

(56) References Cited

U.S. PATENT DOCUMENTS

| | | | |
|---|---|---|---|
| 6,382,191 B1 * | 5/2002 | Curran et al. .................. | 123/518 |
| 6,557,534 B2 * | 5/2003 | Robichaux et al. ............ | 123/520 |
| 6,624,527 B1 * | 9/2003 | Crombez et al. ............ | 290/40 C |
| 7,591,252 B1 * | 9/2009 | Park .............................. | 123/520 |
| 7,847,495 B2 | 12/2010 | Oyobe et al. | |

(Continued)

FOREIGN PATENT DOCUMENTS

| | | |
|---|---|---|
| JP | 06165309 A | 6/1994 |
| JP | 2000282969 A | 10/2000 |

(Continued)

*Primary Examiner* — Thomas Moulis
*Assistant Examiner* — Elizabeth Hadley
(74) *Attorney, Agent, or Firm* — Dinsmore & Shohl LLP (57) ABSTRACT

The invention relates to a control apparatus for a hybrid system that output engine drive force and electric motor drive force, and selectively performs an engine operation mode in which at least the engine is operated, and an engine operation stop mode in which engine operation is stopped. In cases where release of vaporized fuel captured in a vaporized-fuel capturing/releasing device is required, when the engine is being operated, release of vaporized fuel is started if there is no abnormality in the vaporized-fuel capturing/releasing device, and operation of the engine is continued to release the vaporized fuel until condition for terminating release of the vaporized fuel is satisfied; and in cases where release of the vaporized fuel is required, when the engine is not being operated, operation of the engine is started and release of the vaporized fuel is started if there is no abnormality in the vaporized-fuel capturing/releasing device.

5 Claims, 4 Drawing Sheets

(56) References Cited

U.S. PATENT DOCUMENTS

| | | | |
|---|---|---|---|
| 7,866,424 B2 * | 1/2011 | Sauvlet et al. | 180/65.21 |
| 8,181,631 B2 * | 5/2012 | Bohr et al. | 123/520 |
| 2002/0096137 A1 * | 7/2002 | Kobayashi et al. | 123/179.4 |
| 2008/0092858 A1 * | 4/2008 | Satoh et al. | 123/520 |
| 2008/0234915 A1 | 9/2008 | Nomasa et al. | |
| 2009/0070001 A1 * | 3/2009 | Takakura et al. | 701/102 |
| 2010/0250039 A1 * | 9/2010 | Bryan et al. | 701/22 |
| 2011/0029176 A1 * | 2/2011 | Rauner et al. | 701/22 |
| 2011/0079201 A1 * | 4/2011 | Peters et al. | 123/520 |
| 2013/0081600 A1 * | 4/2013 | Fukui et al. | 123/520 |

FOREIGN PATENT DOCUMENTS

| | | |
|---|---|---|
| JP | 2007062639 A | 3/2007 |
| JP | 2008238837 A | 10/2008 |
| JP | 2009-191758 A | 8/2009 |

* cited by examiner

CONTROL APPARATUS AND CONTROL METHOD FOR HYBRID SYSTEM

INCORPORATION BY REFERENCE

The disclosure of Japanese Patent Application No. 2011-243369 filed on Nov. 7, 2011 including the specification, drawings and abstract is incorporated herein by reference in its entirety.

BACKGROUND OF THE INVENTION

1. Field of the Invention

The invention relates to a control apparatus and a control method for a hybrid system.

2. Description of Related Art

Japanese Patent Application Publication No. 2008-238837 (JP-2008-238837 A) discloses a hybrid system capable of outputting drive force output by an internal combustion engine and drive force output by an electric motor, wherein at least an engine operation mode in which the internal combustion engine is operated and an engine operation stop mode in which the internal combustion engine is not operated are performed selectively. Furthermore, an internal combustion engine is available which includes a vaporized-fuel capturing/releasing apparatus that captures vaporized fuel generated inside a fuel tank of the internal combustion engine and releases the captured vaporized fuel into an air intake passage of the internal combustion engine.

Here, if an internal combustion engine including a vaporized-fuel capturing/releasing apparatus is used in the hybrid system described above, vaporized fuel continues to flow into the vaporized-fuel capturing/releasing apparatus from the fuel tank, even while the engine operation stop mode is being implemented in the hybrid system. Consequently, the amount of vaporized fuel which is captured by the vaporized fuel capture and release apparatus becomes large when the engine operation stop mode is implemented over a long period of time. Hence, there are cases where it becomes necessary to release vaporized fuel from the vaporized-fuel capturing/releasing apparatus while the engine operation stop mode is being implemented.

However, when it has become necessary to release vaporized fuel from the vaporized-fuel capturing/releasing apparatus, if there is an abnormality in the vaporized-fuel capturing/releasing apparatus, then even if release of vaporized fuel is to be performed from the vaporized-fuel capturing/releasing apparatus (hereinafter, this release is simply called "release of vaporized fuel"), satisfactory release of vaporized fuel cannot be performed. Consequently, if the internal combustion engine is operated only in order to release vaporized fuel in spite of the fact that there is an abnormality in the vaporized-fuel capturing/releasing apparatus, fuel is consumed unnecessarily in the internal combustion engine and the fuel economy of the internal combustion engine is unnecessarily reduced.

SUMMARY OF THE INVENTION

The invention suppresses reduction in the fuel economy of an internal combustion engine due to operation of the engine being continued or operation of the engine being started only in order to release vaporized fuel, in spite of the fact that there is an abnormality in the vaporized fuel capture and release apparatus.

A control apparatus for a hybrid system according to a first aspect of the invention relates to a control apparatus for a hybrid system that can output drive force output by an internal combustion engine and drive force output by an electric motor, and that selectively performs an engine operation mode in which at least the internal combustion engine is operated, and an engine operation stop mode in which operation of the internal combustion engine is stopped. The first aspect of the invention comprises a vaporized-fuel capturing/releasing device that captures vaporized fuel generated inside a fuel tank and releases the captured vaporized fuel, and a controller. In cases where release of vaporized fuel captured in the vaporized-fuel capturing/releasing device is required, (1) when the internal combustion engine is being operated with an object other than the release of vaporized fuel, the controller starts release of the vaporized fuel if there is no abnormality in the vaporized-fuel capturing/releasing device, and continues operation of the internal combustion engine to release the vaporized fuel until terminating condition of release of the vaporized fuel is satisfied. In cases where release of the vaporized fuel is required, (2) when the internal combustion engine is not being operated, the controller starts operation of the internal combustion engine and starts release of the vaporized fuel, if there is no abnormality in the vaporized-fuel capturing/releasing device.

According to the first aspect of the invention, the following beneficial effects are obtained. More specifically, if there is an abnormality in the vaporized-fuel capturing/releasing device, it is not possible to release the vaporized fuel satisfactorily, even if release of the vaporized fuel from the vaporized-fuel capturing/releasing device (below, this release is simply called "release of vaporized fuel") is performed. Therefore, if operation of the internal combustion engine is continued or operation of the internal combustion engine is started only in order to perform release of vaporized fuel, in spite of the fact that there is an abnormality in the vaporized fuel supplementation and release device, then fuel is consumed unnecessarily in the internal combustion engine and the fuel economy of the internal combustion engine is unnecessarily reduced.

However, in the first aspect of the invention, if release of vaporized fuel is required and if the internal combustion engine is being operated with an object other than the release of vaporized fuel, the release of vaporized fuel is started only when there is no abnormality in the vaporized-fuel capturing/releasing device, and operation of the internal combustion engine continues to release the vaporized fuel until terminating condition of release of vaporized fuel is satisfied, even if the operation of the internal combustion engine ought to be stopped due to having achieved the aforementioned object. Alternatively, if release of vaporized fuel is required and if the internal combustion engine is not being operated, then operation of the internal combustion engine is started and release of vaporized fuel is started, only when there is no abnormality in the vaporized-fuel capturing/releasing device.

Therefore, according to the first aspect of the invention, it is possible to suppress reduction in the fuel economy of an internal combustion engine due to operation of the internal combustion engine being continued or operation of the internal combustion engine being started only in order to release vaporized fuel, in spite of the fact that there is an abnormality in the vaporized-fuel capturing/releasing device.

A control method for a hybrid system according to a second aspect of the invention relates to a control method for a hybrid system that can output drive force output by an internal combustion engine and drive force output by an electric motor, and that selectively performs an engine operation mode in which at least the internal combustion engine is operated, and an engine operation stop mode in which operation of the internal combustion engine is stopped. The control method according to the second aspect of the invention, comprises starting, when the internal combustion engine is being operated with an object other than the release of vaporized fuel, release of vaporized fuel if there is no abnormality in a vaporized-fuel capturing/releasing device that captures vaporized fuel generated inside a fuel tank and releases the captured vaporized fuel, and continuing operation of the internal combustion engine to release the vaporized fuel until terminating condition of the vaporized fuel is satisfied, in cases where release of the vaporized fuel captured in the vaporized-fuel capturing/releasing device is required; and (2) starting, when the internal combustion engine is not being operated, operation of the internal combustion engine and starting release of the vaporized fuel, if there is no abnormality in the vaporized-fuel capturing/releasing device in cases where release of the vaporized fuel is required.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
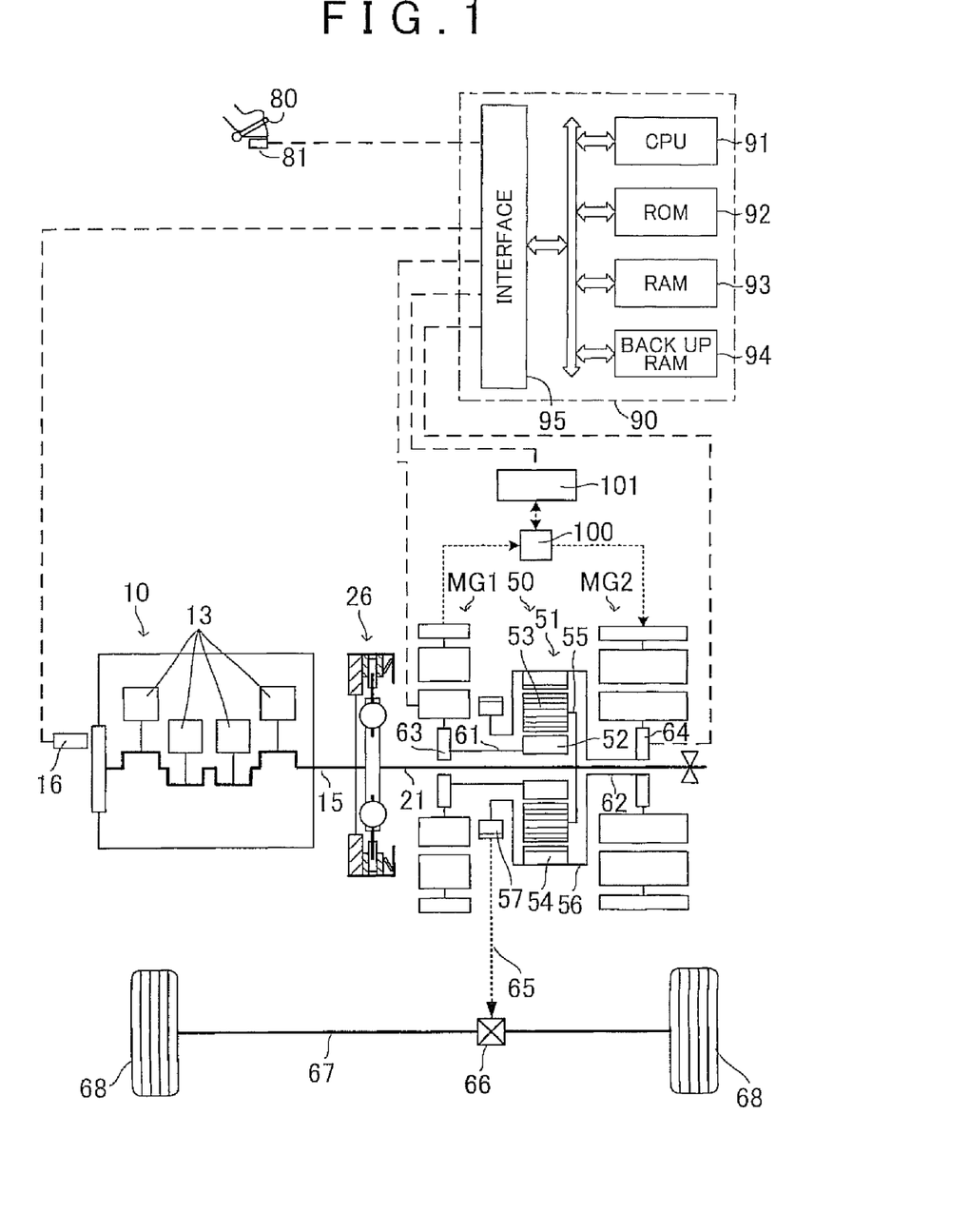
FIG. 1 is a diagram showing a composition of a hybrid vehicle including a hybrid system to which the control apparatus relating to one embodiment of the invention is applied.

Below, an embodiment of the control apparatus and control method for a hybrid system according to the invention are described. FIG. 1 shows a composition of a hybrid vehicle equipped with a hybrid system in which the control apparatus and the control method according to one embodiment of the invention are applied. In FIG. 1, MG1 and MG2 are motor generators (which are respectively called a "first motor generator" and a "second motor generator" below), 10 is an internal combustion engine, 15 is a crank shaft (output shaft), 16 is a crank position sensor, 21 is an input shaft, 26 is a torsional damper, 50 is a drive force distribution mechanism, 100 is an inverter, 101 is a battery, 80 is an accelerator pedal, 81 is an accelerator pedal depression amount sensor and 90 is an electronic control apparatus.

The electronic control apparatus 90 is constituted by a microcomputer. Furthermore, the electronic control apparatus 90 also includes a microprocessor (CPU) 91, a read-only memory (ROM) 92, a random access memory (RAM) 93, a back-up RAM 94 and an interface 95. The CPU 91, ROM 92, RAM 93, back-up RAM 94 and interface 95 are mutually connected via a two-way bus.

Figure 2:
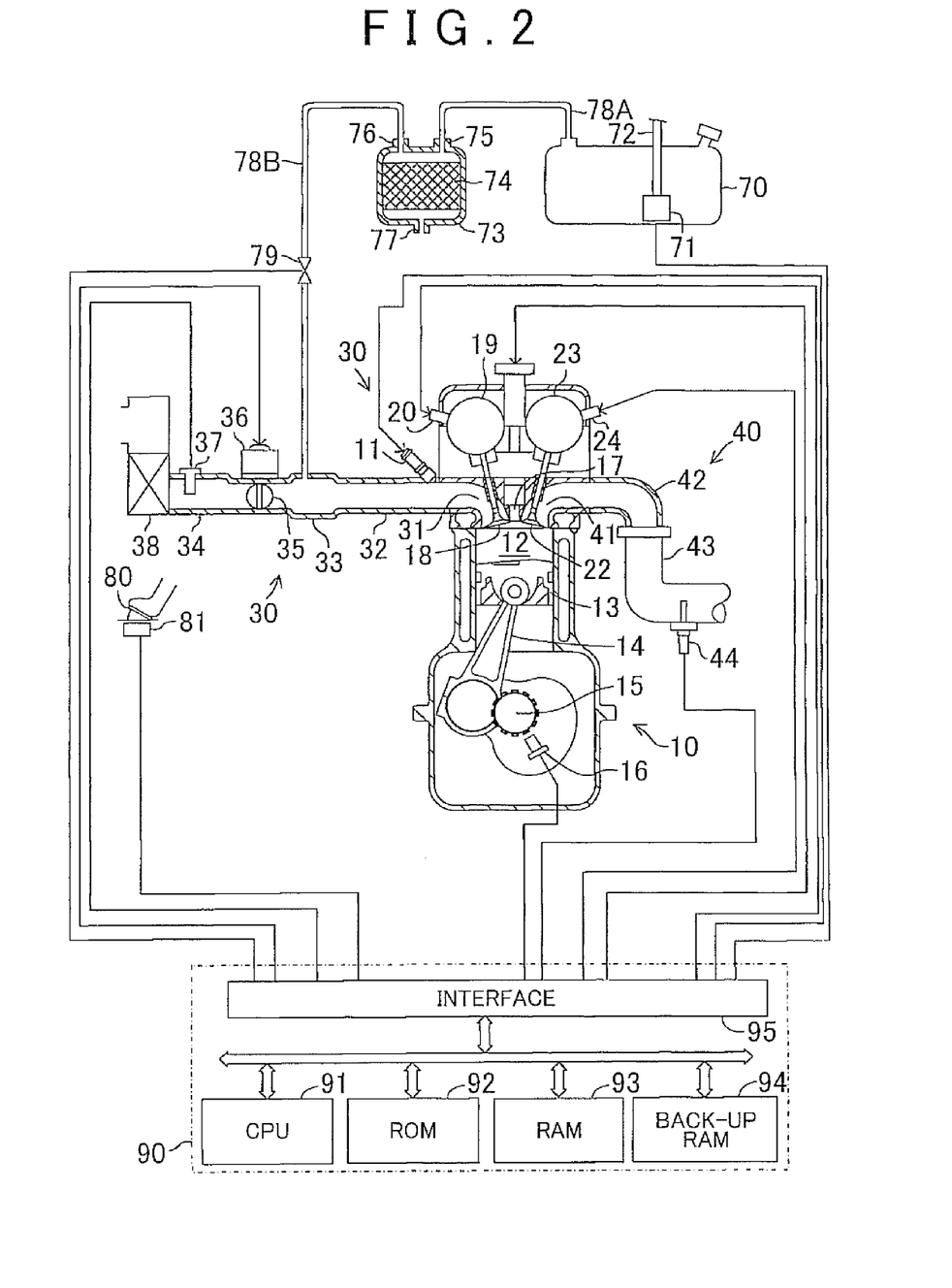
FIG. 2 is a diagram showing details of an internal combustion engine shown in FIG. 1.

FIG. 2 shows details of an internal combustion engine 10. The internal combustion engine 10 shown in FIG. 2 is a spark ignition internal combustion engine (a so-called gasoline engine). In FIG. 2, 11 is a fuel injection valve, 12 is a combustion chamber, 13 is a piston, 14 is a con rod, 15 is a crank shaft, 16 is a crank position sensor, 17 is a spark plug, 18 is an air intake valve, 19 is an air intake valve drive mechanism, 20 is an actuator for driving the air intake valve drive mechanism 19, 22 is an exhaust valve, 23 is an exhaust valve drive mechanism, and 24 is an actuator for driving the exhaust valve drive mechanism 23. FIG. 2 shows only one combustion chamber 12, but as shown by the four pistons 13 in FIG. 1, the internal combustion engine according to the present embodiment includes four combustion chambers (in other words, cylinders) and each of the aforementioned constituent elements described above corresponding to these.

Furthermore, in FIG. 2, 30 is an air intake passage, 31 is an air intake port, 32 is an air intake manifold, 33 is a surge tank, 34 is an air intake pipe, 35 is a throttle valve, 36 is an actuator for driving a throttle valve 35, 37 is an air flow meter, 38 is an air cleaner, 40 is an exhaust passage, 41 is an exhaust port, 42 is an exhaust manifold, 43 is an exhaust pipe and 44 is an air-fuel ratio sensor. The air intake passage 30 is constituted by the air intake port 31, the air intake manifold 32, the surge tank 33 and the air intake pipe 34. On the other hand, the exhaust passage 40 is constituted by the exhaust port 41, the exhaust manifold 42 and the exhaust pipe 43.

Furthermore, in FIG. 2, 70 is a fuel tank, 71 is a fuel pump, 72 is a fuel supply passage, 73 is a canister, 74 is an adsorbent, 75 is a fuel tank port, 76 is a purge port, 77 is an air port, 78A is an upstream side vaporized fuel passage, 78B is a downstream side vaporized fuel passage and 79 is a purge control valve.

The fuel injection valve 11 is installed in a portion of the air intake manifold 32 which is adjacent to the air intake port 31. The fuel pump 71 is connected via the fuel supply passage 72 to the fuel injection valve 11. The fuel pump 71 supplies fuel at high pressure via a fuel supply passage 72 to the fuel injection valve 11. Furthermore, the fuel injection valve 11 is electrically connected to an interface 95 of an electronic control apparatus 90. The electronic control apparatus 90 sends, to the fuel injection valve 11, a command signal for causing the fuel injection valve 11 to inject fuel. Furthermore, the fuel pump 71 is also electrically connected to the interface 95 of the electronic control apparatus 90. The electronic control apparatus 90 sends, to the fuel pump 71, a control signal controlling operation of the fuel pump 71 in such a manner that a pressure of fuel supplied from the fuel pump 71 to the fuel injection valve 11 is maintained at a predetermined pressure. When a command signal is sent from to the fuel injection valve 11 from the electronic control apparatus 90, the fuel injection valve 11 injects fuel into the air intake port 31.

The spark plug 17 is installed in a cylinder head of the internal combustion engine 10 in such a manner that a discharging electrode thereof is exposed in the combustion chamber 12. Furthermore, the spark plug 17 is electrically connected to the interface 95 of the electronic control apparatus 90. The electronic control apparatus 90 sends a command signal for causing the spark plug 17 to generate a spark, to the spark plug 12.

One end of the air intake manifold 32 branches into a plurality of pipes and these branched pipes are connected to air intake ports 31 formed corresponding respectively to each of the plurality of combustion chambers 12 in the internal combustion engine 10. Furthermore, the other end of the air intake manifold 32 is connected to one end of the surge tank 33. One end of the exhaust manifold 42 branches into a plurality of pipes and these branched pipes are connected to exhaust ports 41 formed corresponding respectively to each of the plurality of combustion chambers 12 in the internal combustion engine. Furthermore, the other end of the exhaust manifold 42 is connected to one end of the exhaust pipe 43.

The throttle valve 35 is disposed in the air intake pipe 34. When the opening degree of the throttle valve 35 (below, this opening degree is called the "throttle valve opening degree") is changed, the flow passage surface area in the air intake pipe 34 changes in the region where the throttle valve 35 is disposed. Consequently, the amount of air passing through the throttle valve 35 changes. Consequently, the amount of air taken into the combustion chamber changes. An actuator for changing this opening degree (below, this actuator is called the "throttle valve actuator") 36 is connected to the throttle valve 35. Furthermore, the throttle valve actuator 36 is electrically connected to the interface 95 of the electronic control apparatus 90. The electronic control apparatus 90 sends a control signal for driving the throttle valve actuator 36 so as to control the throttle valve opening degree to a target throttle valve opening degree, to the throttle valve actuator 36.

The internal combustion engine 10 produces a mixture of the air taken into the combustion chamber 12 and the fuel injected from the fuel injection valve 11, and causes this mixture to combust by a spark generated by the spark plug 17. When the fuel combusts in the combustion chamber 12, torque is output to the crank shaft 15 via the piston 13 and the con rod 14.

The air flow meter 37 is arranged in the air intake pipe 34, to the upstream side of the throttle valve 35. Furthermore, the air flow meter 37 is electrically connected to the interface 95 of the electronic control apparatus 90. The air flow meter 37 outputs an output value corresponding to the amount of air passing through the region where the air flow meter 37 is arranged. This output value is input to the electronic control apparatus 90. The electronic control apparatus 90 calculates the amount of air passing through the air flow meter 37, and hence the amount of air taken into the combustion chamber, on the basis of this output value.

The crank position sensor 16 is arranged near to the output shaft of the internal combustion engine, in other words, the crank shaft 15. Furthermore, the crank position sensor 16 is electrically connected to the interface 95 of the electronic control apparatus 90. The crank position sensor 16 outputs an output value corresponding to the rotational phase of the crank shaft 15. This output value is input to the electronic control apparatus 90. The electronic control apparatus 90 calculates the engine speed (in other words, the number of revolutions of the crank shaft 15 of the internal combustion engine) on the basis of this output value.

The air-fuel ratio sensor 44 is arranged in the exhaust passage 40 (and more specifically, in the exhaust pipe 43). Furthermore, the air-fuel ratio sensor 44 is electrically connected to the interface 95 of the electronic control apparatus 90. The air-fuel ratio sensor 44 outputs an output value corresponding to the concentration of oxygen in the exhaust gas passing through the region where the air-fuel sensor 44 is arranged. This output value is input to the electronic control apparatus 90. The electronic control apparatus 90 calculates the air-fuel ratio of the mixture which is formed in the combustion chamber on the basis of this output value.

The air intake valve drive mechanism 19 is connected to the air intake valve 18. Furthermore, the air intake valve drive mechanism 19 can be operated so as to control the amount of lift of the air intake valve 18. The amount of gas taken into the combustion chamber 12 changes in accordance with the amount of lift of the air intake valve 18. An actuator for driving the air intake valve drive mechanism 19 (below, this actuator is called the "air intake valve drive mechanism actuator") 20 is connected to the air intake valve drive mechanism 19. Furthermore, the air intake valve drive mechanism actuator 20 is electrically connected to the interface 95 of the electronic control apparatus 90. The electronic control apparatus 90 sends a control signal to the air intake valve drive mechanism actuator 20 for operating the air intake valve drive mechanism 19 so as to control the amount of lift of the air intake valve 18 to a target amount of lift.

The exhaust valve drive mechanism 23 is connected to the exhaust valve 22. Furthermore, the exhaust valve drive mechanism 23 can be operated so as to control the amount of lift of the exhaust valve 22. The amount of exhaust gas emitted from the combustion chamber 12 changes in accordance with the amount of lift of the exhaust valve 22. Consequently, the amount of exhaust gas left in the combustion chamber 12 changes, and hence the amount of gas taken into the combustion chamber 12 changes. An actuator for driving the exhaust valve drive mechanism 23 (below, this actuator is called the "exhaust valve drive mechanism actuator") 24 is connected to the exhaust valve drive mechanism 23. The exhaust valve drive mechanism actuator 25 is electrically connected to the interface 95 of the electronic control apparatus 90. The electronic control apparatus 90 sends a control signal to the exhaust valve drive mechanism actuator 24 for operating the exhaust valve drive mechanism 23 so as to control the amount of lift of the air intake valve 22 to a target amount of lift.

One end of the upstream side vaporized fuel passage 78A is connected to the fuel tank 70, and the other end is connected to the fuel tank port 75 (in other words, the canister 73). The vaporized fuel generated inside the fuel tank 70 can flow into the canister 73 via the upstream side vaporized fuel passage 78A. The vaporized fuel which has flowed into the canister 73 is adsorbed by the adsorbent 74. The vaporized fuel which has flowed into the canister 73 is captured in the canister 73 by being adsorbed by the adsorbent 74. Alternatively, the vaporized fuel is captured in the canister 73 by being present inside the canister 73 without being adsorbed by the adsorbent 74. One end of the downstream side vaporized fuel passage 78B is connected to the purge port 76 (in other words, the canister 73) and the other end thereof is connected to the surge canister 33 (in other words, the air intake passage 30). The vaporized fuel in the canister 73 can flow into the air intake passage 30 via the downstream side vaporized fuel passage 78B. An air port 77 is provided in the canister 73. The air port 77 is provided on the opposite side of the adsorbent 74 provided in the canister from the fuel tank port 75 and the purge port 76. The air port 77 communicates the interior of the canister 73 to the exterior. Consequently, the interior of the canister 73 is open to the external air.

A purge control valve 79 is arranged in the downstream side vaporized fuel passage 78B. The purge control valve 79 is composed in such a manner that the opening degree of the purge control valve 79 (below, this opening degree is called the "purge control valve opening degree") can be changed. When the purge control valve opening degree is changed, the amount of vaporized fuel passing through the purge control valve 79 changes. Furthermore, when the purge control valve 79 is opened, the vaporized fuel captured in the canister 73 is released into the air intake passage 30. The purge control valve 79 is electrically connected to the interface 95 of the electronic control apparatus 90. The electronic control apparatus 90 sends a control signal to the purge control valve 79 in order to operate the purge control valve 79 in such a manner that the purge control valve opening degree is controlled to a target purge control valve opening degree.

Returning to FIG. 1, the drive force distribution apparatus 50 has a planetary gear apparatus 51. The planetary gear apparatus 51 includes a sun gear 52, a planetary gear 53 and a ring gear 54. The planetary gear 53 meshes with the sun gear 52, and also meshes with the ring gear 54. The sun gear 52 is connected to a shaft 61 of the first motor generator MG1. Consequently, the first motor generator MG1 can be driven to rotate by torque input to the first motor generator MG1 from the sun gear 52, and can also output torque to the sun gear 52. The first motor generator MG1 can generate electricity by being driven to rotate by torque input to the first motor generator MG1 from the sun gear 52. The ring gear 54 is connected to a shaft 62 of the second motor generator MG2 via the ring gear carrier 56. Consequently, the second motor generator MG2 is able to output torque to the ring gear 54, and can be driven to rotate by torque input to the second motor generator MG2 from the ring gear 54. The second motor generator MG2 can generate electricity by being driven to rotate by torque input to the second motor generator MG2 from the ring gear 54.

The planetary gear 53 is connected to the crank shaft 15 via the planetary gear carrier 55. Consequently, the planetary gear 53 is driven to rotate by torque input to the planetary gear 53 from the crank shaft 15. Moreover, the planetary gear 53 meshes with the sun gear 52 and the ring gear 54. Therefore, when torque is input to the sun gear 52 from the planetary gear 53, the sun gear 52 is driven to rotate by this torque, and when torque is input to the ring gear 54 from the planetary gear 53, the ring gear 54 is driven to rotate by this torque. Conversely, when torque is input from the sun gear 52 to the planetary gear 53, the planetary gear 53 is driven to rotate by this torque, and when torque is input from the ring gear 54 to the planetary gear 53, the planetary gear 53 is driven to rotate by this torque.

The ring gear 54 is connected to an output gear 57 via the ring gear carrier 56. Therefore, the output gear 57 is driven to rotate by torque input from the ring gear 54 to the output gear 57. Furthermore, the ring gear 54 is driven to rotate by torque input from the output gear 57 to the ring gear 54.

Moreover, the first motor generator MG1 has a resolver 63. The resolver 63 is connected to the interface 95 of the electronic control apparatus 90. The resolver 63 outputs an output value corresponding to an angle of rotation of the first motor generator MG1. This output value is input to the electronic control apparatus 90. The electronic control apparatus 90 calculates a rotational speed of the first motor generator on the basis of this output value. On the other hand, the second motor generator MG2 has a resolver 64. The resolver 64 is connected to the interface 95 of the electronic control apparatus 90. The resolver 64 outputs an output value corresponding to an angle of rotation of the second motor generator. This output value is input to the electronic control apparatus 90. The electronic control apparatus 90 calculates a rotational speed of the second motor generator on the basis of this output value.

Furthermore, the first motor generator MG1 is electrically connected to a battery 101 via an inverter 100. Therefore, when the first motor generator MG1 generates electric power, the power generated by the first motor generator MG1 (below, this power is called the "first generated power") can be supplied to the battery 101 via the inverter 100. Furthermore, the first motor generator MG1 can be driven to rotate by power supplied from the battery 101, and is composed in such a manner that the rotational speed of the first motor generator MG1 can be controlled by controlling the control torque applied to the first motor generator MG1 by the power supplied from the battery 101.

Furthermore, the second motor generator MG2 is electrically connected to the battery 101 via the inverter 100. Consequently, the second motor generator MG2 can be driven to rotate by power supplied from the battery 101, and the rotational speed the second motor generator MG2 can be controlled by controlling the control torque applied to the second motor generator MG2 by the power supplied from the battery 101. Furthermore, when the second motor generator MG2 generates electric power, the power generated by the second motor generator MG2 (below, this power is called the "second generated power") can be supplied to the battery 101 via the inverter 100. The first generated power can be supplied directly to the second motor generator MG2 and the second generated power can be supplied directly to the first motor generator.

Furthermore, the battery 101 is connected to the interface 95 of the electronic control apparatus 90. Information relating to the amount of battery charge (in other words, the amount of power accumulated in the battery 101) is input to the interface 95 of the electronic control apparatus 90. Furthermore, the inverter 100 is also connected to the interface 95 of the electronic control apparatus 90. The amount of power supplied to the second motor generator MG2 and the amount of power supplied to the first motor generator MG1, from the inverter 100, are controlled by a command sent from the electronic control apparatus 90 via the interface 95.

Furthermore, the output gear 57 is connected to a differential gear 66 via a gear column 65. The differential gear 66 is installed on a drive shaft 67. A drive wheel 68 is installed on either end of the drive shaft 67. Therefore, the torque from the output gear 57 is transmitted to the drive wheels 68 via the gear column 65, the differential gear 66 and the drive shaft 67.

An accelerator pedal depression amount sensor 81 is connected to the accelerator pedal 80. Furthermore, the accelerator pedal depression amount sensor 81 is electrically connected to the interface 95 of the electronic control apparatus 90. The accelerator pedal depression amount sensor 81 outputs an output value corresponding to a depression amount of the accelerator pedal 80. This output value is input to the electronic control apparatus 90. The electronic control apparatus 90 calculates the depression amount of the accelerator pedal 80, and hence the output required of the hybrid system, on the basis of this output value. The hybrid system according to the present embodiment is generally constituted by the internal combustion engine 10, the first motor generator MG1 and the second motor generator MG2.

Next, the engine operation mode and the engine operation stop mode according to the present embodiment will be described. In the description given below, "engine operation" means "operation of the internal combustion engine". The engine operation mode according to the present embodiment is a mode in which at least the engine is operated. More specifically, the engine operation mode according to the present embodiment is, for example, a mode in which the engine is operated without driving either the first motor generator or the second motor generator, or a mode in which the engine is operated as well as driving at least one the first motor generator and the second motor generator. Consequently, in the present embodiment, when the engine operation mode is selected, the engine is operated.

On the other hand, the engine operation stop mode according to present embodiment is a mode in which at least operation of the engine is stopped. More specifically, the engine operation stop mode is a mode in which, for example, at least one of the first motor generator and the second motor generator is driven. Consequently, in the present embodiment, when the engine operation stop mode is selected, the operation of the engine is stopped.

Next, the release of vaporized fuel according to the present embodiment will be described. In the description given below, "engine operation" means "operation of the internal combustion engine", "vaporized-fuel capturing/releasing apparatus" means "a composition used to capture vaporized fuel in the canister and to release the captured vaporized fuel from the canister to the air intake passage, for example, an apparatus constituted by the upstream side vaporized fuel passage, the canister, the downstream side vaporized fuel passage and the purge control valve", and the "release of vaporized fuel" means "release of vaporized fuel captured in the canister, from the canister to the air intake passage".

In the present embodiment, if the engine is being operated with an object other than release of vaporized fuel when release of vaporized fuel is required (hereinafter, this object is called a "particular object"), then release of vaporized fuel is started, unless there is an abnormality in the vaporized-fuel capturing/releasing apparatus. Even if operation of the engine ought to be stopped due to the particular object having been achieved, operation of the engine is continued and release of the vaporized fuel is carried out until the release of the vaporized fuel is completed. On the other hand, if release of the vaporized fuel is required, and there is an abnormality in the vaporized fuel capture and release apparatus, then the release of the vaporized fuel is prohibited. Consequently, the release of vaporized fuel does not start and operation of the engine is stopped when operation of the engine ought to be stopped due to the particular object described above having been achieved.

Alternatively, in the present embodiment, if the engine is not being operated when release of vaporized fuel is required, then unless there is an abnormality in the vaporized-fuel capturing/releasing apparatus, operation of the engine is started and release of the vaporized fuel is also started. Operation of the engine is continued and release of vaporized fuel is performed until the release of vaporized fuel is completed. On the other hand, if there is an abnormality in the vaporized-fuel capturing/releasing apparatus, then the start of operation of the engine and the release of vaporized fuel are prohibited. Consequently, neither operation of the engine nor release of vaporized fuel are started.

In the present embodiment, the vaporized fuel in the canister is released into the air intake passage due to the purge control valve being opened when the engine is being operated. In other words, when the engine is being operated, a negative pressure is generated in the region of the air intake passage where the downstream side vaporized fuel passage is connected. Therefore, if the purge control valve is open while the engine is being operated, then vaporized fuel inside the canister is released into the air intake passage due to the negative pressure inside the air intake passage.

However, if the negative pressure generated inside the air intake passage is small and the vaporized fuel cannot be released satisfactorily from the canister into the air intake passage, then a pump is installed in the air port of the canister, for example. If release of the vaporized fuel is performed, then the purge control valve is opened and air at high pressure is sent into the canister by the pump. Therefore, it is also possible to release the vaporized fuel from the canister into the air intake passage.

Furthermore, in releasing the vaporized fuel, it is necessary to operate the engine in order to generate a negative pressure inside the air intake passage as described above, or in order to take vaporized fuel that has been released into the air intake passage, into the combustion chamber, and to consume the vaporized fuel.

According to the present embodiment, the following beneficial effects are obtained. More specifically, if there is an abnormality in the vaporized-fuel capturing/releasing apparatus, then even if release of vaporized fuel is performed, the vaporized fuel cannot be released satisfactorily. Therefore, if operation of the engine is continued or operation of the engine is started only in order to perform release of vaporized fuel, in spite of the fact that there is an abnormality in the vaporized-fuel capturing/releasing apparatus, fuel is consumed wastefully in the internal combustion engine and the fuel economy of the internal combustion engine is unnecessarily reduced.

However, in the present embodiment, if there is an abnormality in the vaporized-fuel capturing/releasing apparatus, then even if release of the vaporized fuel is required when the engine is being operated with an object other than the release of vaporized fuel (in other words, the particular object described above), the release of vaporized fuel is not started. In other words, in the embodiment of the invention, if there is an abnormality in the vaporized-fuel capturing/releasing apparatus, then even if the release of vaporized fuel is required when the internal combustion engine is being operated, the release of vaporized fuel does not start. Therefore, even if the release of vaporized fuel is required when operation of the engine has stopped due to the object described above having been achieved, or if the engine is not being operated, operation of the engine does not start.

Consequently, according to the present embodiment, a beneficial effect is obtained in that it is possible to suppress reduction in the fuel economy of an internal combustion engine due to operation of the engine being continued or operation of the engine being started only in order to release vaporized fuel, in spite of the fact that there is an abnormality in the vaporized-fuel capturing/releasing apparatus.

Figure 3:
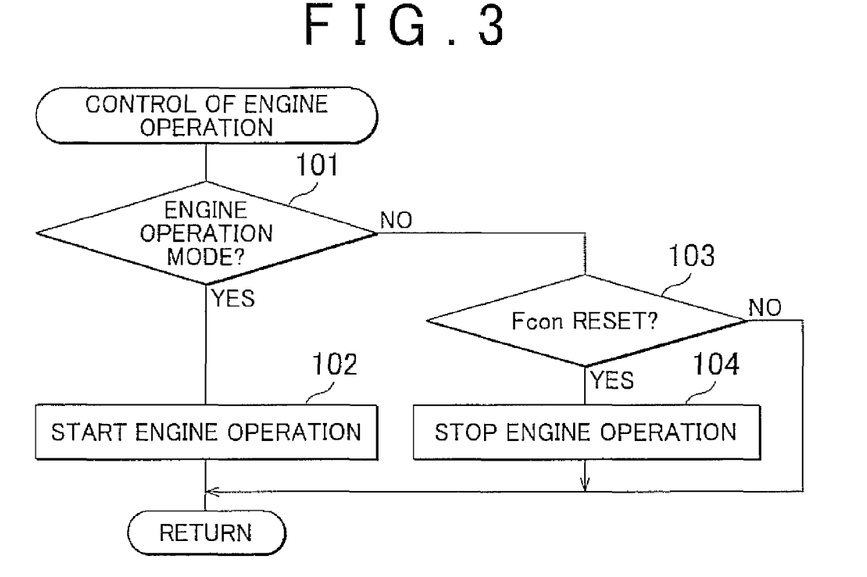
FIG. 3 is a diagram showing one example of a routine for implementing compulsory engine operation relating to one embodiment of the invention.

Next, one example of a routine for implementing control of operation of the engine according to the present embodiment will be described. FIG. 3 shows one example of this routine. This routine is a routine which is started each time the crank angle reaches the predetermined angle.

When the routine in FIG. 3 is started, firstly, in step 101, it is determined whether or not the engine operation mode has been selected. Here, if it is determined that the engine operation mode has been selected, then the routine advances to step 102, operation of the engine is started, and then the routine terminates. On the other hand, if it is determined in step 101 that the engine stop mode has not been selected, then the routine advances to step 103.

In step 103, it is determined whether or not an engine operation continuation requirement flag Fcon has been reset. Here, if it is determined that the engine operation continuation requirement flag Fcon has been reset, then the routine advances to step 104, operation of the engine is stopped, and then the routine terminates. On the other hand, if it is determined at step 103 that the engine operation continuation requirement flag Fcon has not been reset, then the routine terminates. The engine operation continuation requirement flag Fcon is a flag which is set when it is required to continue operation of the engine, and which is reset when there is no such requirement, and more specifically, is a flag which is set or reset by the routine in FIGS. 4 and 5.

Figure 4:
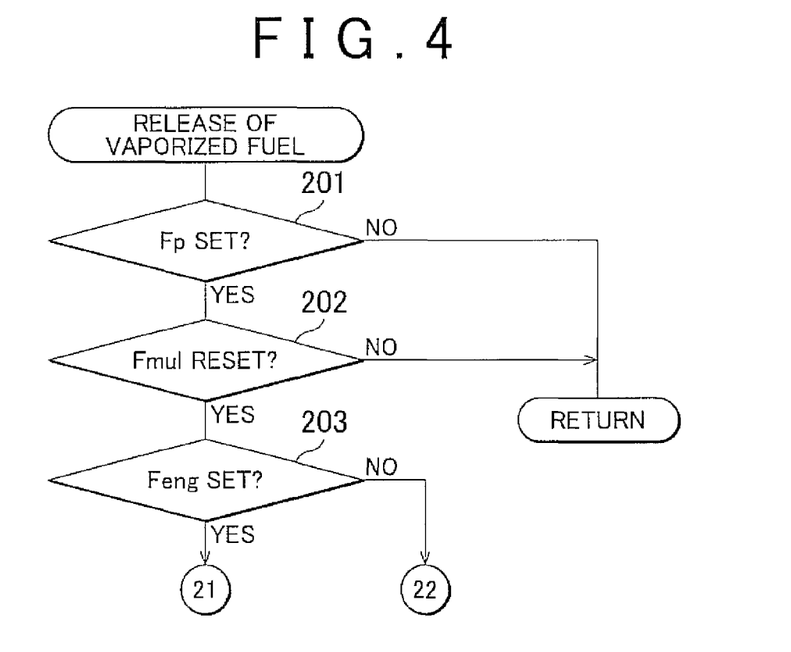
FIG. 4 is a diagram showing a portion of one example of a routine for implementing release of vaporized fuel relating to one embodiment of the invention.
Figure 5:
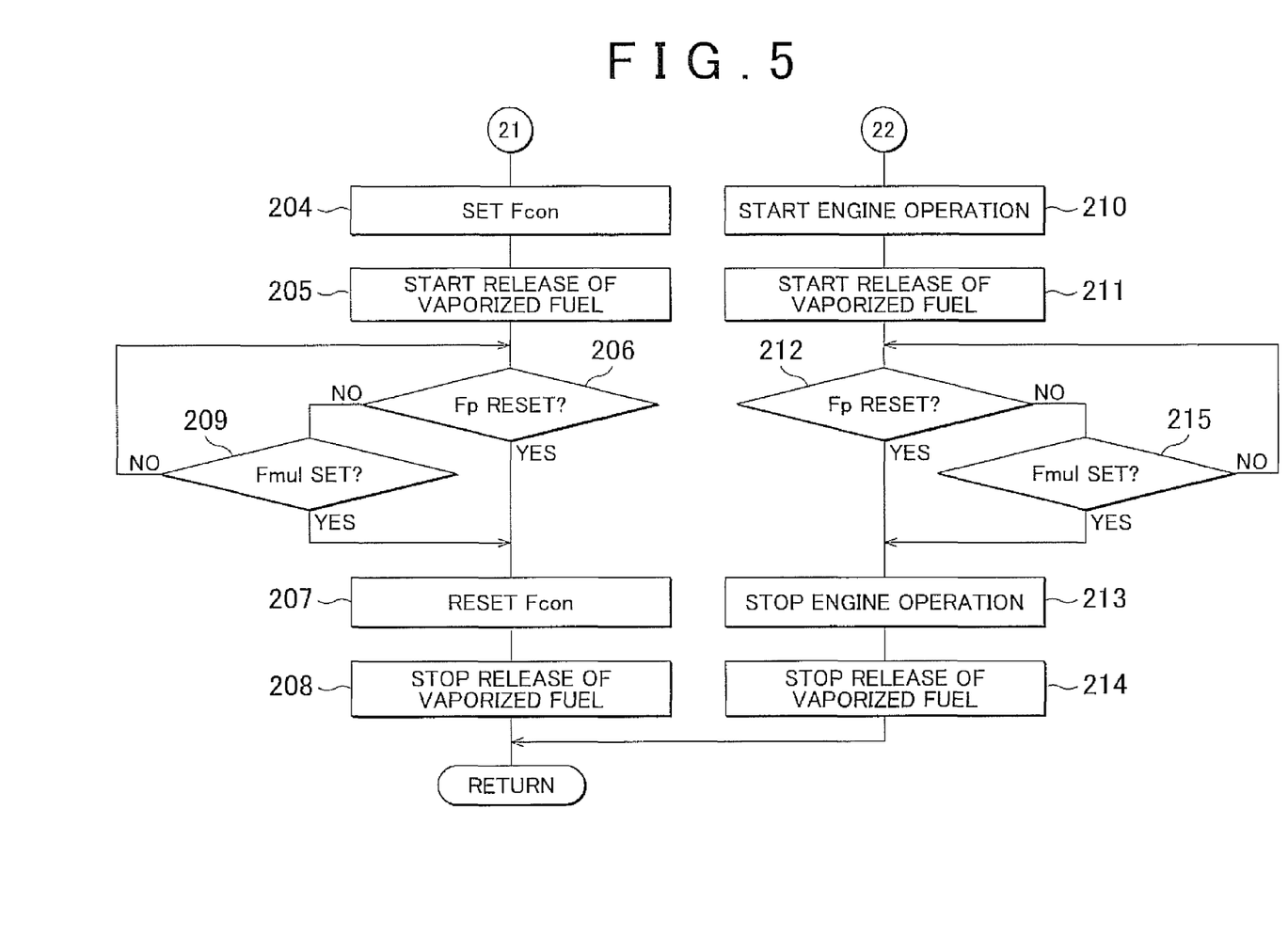
FIG. 5 is a diagram showing a portion of one example of a routine for implementing release of vaporized fuel relating to one embodiment of the invention.

Next, one example of a routine for implementing release of vaporized fuel according to the present embodiment will be described. FIGS. 4 and 5 show one example of this routine. This routine is a routine which is started each time the crank angle reaches the predetermined angle.

When the routine in FIGS. 4 and 5 is started, firstly, in step 201, it is determined whether or not the vaporized fuel release flag Fp has been set. Here, if it is determined that the vaporized fuel release flag Fp has been set, then the routine proceeds to step 202. On the other hand, if it is determined at step 201 that the vaporized fuel release flag Fp has not been set, then the routine terminates. The vaporized fuel release flag Fp is a flag which is set when it has become necessary to release vaporized fuel and is reset when the release of vaporized fuel is completed.

In step 202, it is determined whether or not a abnormality flag Fmul has been reset. Here, if it is determined that the abnormality flag Fmul has been reset, then the routine proceeds to step 203. On the other hand, if it is determined at step 202 that the abnormality flag Fmul has not been reset, then the routine terminates. Here, the abnormality flag Fmul is a flag which is set when there is a abnormality in the vaporized-fuel capturing/releasing apparatus, and which is reset when there is no abnormality in the vaporized-fuel capturing/releasing apparatus.

In step 203, it is determined whether or not an engine operation flag Feng has been set. Here, if it is determined that the engine operation flag Feng has been set, then the routine proceeds to step 204. On the other hand, if it is determined in step 203 that the engine operation flag Feng has not been set, then the routine advances to step 210. The engine operation flag Feng is a flag which is set when operation of the engine has been started with an object other than release of vaporized fuel (in other words, with the particular object described above), and which is reset when operation of the engine ought to be stopped due to having achieved the particular object described above.

In step 204, the engine operation continuation requirement flag Fcon is set. Next, in step 205, the release of vaporized fuel is started. Thereupon, in step 206, it is determined whether or not the vaporized fuel release flag Fp has been reset. Here, if it is determined that the vaporized fuel release flag Fp has been reset, then the routine proceeds to step 207. On the other hand, if it is determined in step 206 that the vaporized fuel release flag Fp has not been reset, then the routine advances to step 209.

In step 209, it is determined whether or not the abnormality flag Fmul has been set. Here, if it is determined that the abnormality flag Fmul has been set, then the routine proceeds to step 207. On the other hand, if it is determined that the abnormality flag Fmul has not been set, then the routine returns to step 206.

In step 207, the engine operation continuation requirement flag Fcon is reset. Thereupon, in step 208, the release of vaporized fuel is stopped, and the routine then terminates.

In step 210, operation of the engine is started. Next, in step 211, the release of vaporized fuel is started. Thereupon, in step 212, it is determined whether or not the vaporized fuel release flag Fp has been reset. Here, if it is determined that the vaporized fuel release flag Fp has been reset, then the routine proceeds to step 213. On the other hand, if it is determined in step 212 that the vaporized fuel release flag Fp has not been reset, then the routine advances to step 215.

In step 215, it is determined whether or not the abnormality flag Fmul has been set. Here, if it is determined that the abnormality flag Fmul has been set, then the routine proceeds to step 213. On the other hand, if it is determined in step 215 that the abnormality flag Fmul has not been set, then the routine returns to step 212.

In step 213, operation of the engine is stopped. Thereupon, in step 214, the release of vaporized fuel is stopped, and the routine then terminates.

As the conditions for selecting the engine operation mode (in other words, the conditions in which the engine is operated), it is possible to use the following conditions, for example. If the engine operation stop mode is selected, then since the engine is not operated, lubricating oil is not circulated through the drive force transmission system of the internal combustion engine. However, this is undesirable from the viewpoint of protecting the drive force transmission system of the internal combustion engine. Therefore, it is possible to set, as a condition under which the engine operation mode is selected, a requirement, or lack of requirement, to circulate lubricating oil through the drive force transmission system by operating the engine, in order to protect the drive force transmission system of the internal combustion engine. In this case, if there is a requirement to circulate the lubricating oil through the drive force transmission system, then the engine operation mode is selected and operation of the engine is started, whereas if there is no such requirement, then the engine operation stop mode is selected and operation of the engine is stopped.

Furthermore, not operating the engine is undesirable from the viewpoint of protecting all of the constituent elements of the internal combustion engine, including the drive force transmission system. Therefore, it is possible to set, as a condition under which the engine operation mode is selected, a requirement, or lack of requirement, to operate the engine in order to protect all of the constituent elements of the internal combustion engine. In this case, if there is a requirement to operate the engine in order to protect all of the constituent elements of the internal combustion engine, then the engine operation mode is selected and operation of the engine is started, whereas if there is no such requirement, then the engine operation stop mode is selected and operation of the engine is stopped.

Furthermore, if detection of abnormalities is performed in the internal combustion engine, then it is necessary to operate the engine. Consequently, since detection of abnormalities in the internal combustion engine cannot be performed unless the engine is operating, then not operating the engine is undesirable also from the viewpoint of detecting abnormalities in the internal combustion engine. Therefore, it is possible to set, as a condition under which the engine operation mode is selected, a requirement, or lack of requirement, to perform detection of abnormalities in the internal combustion engine. In this case, if there is a requirement to perform detection of abnormalities in the internal combustion engine, then the engine operation mode is selected and operation of the engine is started, whereas if there is no such requirement, then the engine operation stop mode is selected and operation of the engine is stopped.

Furthermore, not operating the engine over a long period of time (in other words, selecting the engine operation stop mode over a long period of time) means that lubricating oil is not circulated through the drive force transmission system of the internal combustion engine, for a long period of time, which is particularly undesirable from the viewpoint of protecting the drive force transmission system of the internal combustion engine. Moreover, not operating the engine over a long period of time is particularly undesirable from the viewpoint of protecting all of the constituent elements of the internal combustion engine and detecting abnormalities in the internal combustion engine. Therefore, it is also possible to use the time during which the engine operation stop mode is selected continuously in order to determine a requirement, or lack or requirement, to circulate lubricating oil through the drive force transmission system by operating the engine, in order to protect the drive force transmission system of the internal combustion engine, to determine a requirement, or lack of requirement, to operate the engine in order to protect all of the constituent elements of the internal combustion engine, and to determine a requirement, or lack of requirement, to perform detection of abnormalities in the internal combustion engine. In this case, if the time that the engine operation stop mode has been implemented continuously has reached a predetermined time which is relatively long, then it is determined that there is a requirement to circulate lubricating oil through the drive force transmission system, or it is determined that there is a requirement to operate the engine in order to protect all of the constituent elements of the internal combustion engine, or it is determined that there is a requirement to perform detection of abnormalities in the internal combustion engine.

Furthermore, there is a requirement to circulate lubricating oil through the drive force transmission system for a prescribed period of time in order to protect the drive force transmission system of the internal combustion engine, and there is a requirement to circulate lubricating oil by operating the engine for a prescribed period of time in order to protect all of the constituent elements of the internal combustion engine. Therefore, in cases where engine operation mode is selected and operation of the engine is started in order to protect the drive force transmission system or to protect all of the constituent elements of the internal combustion engine, the operation of the engine should be stopped when a prescribed period of time has elapsed after the start of engine operation, for example. Furthermore, in order to detect abnormalities in the internal combustion engine, it is necessary to operate the engine until detection of abnormalities in the internal combustion engine is completed. Therefore, in cases where the engine operation mode is selected and operation of the engine is started in order to detect abnormalities in the internal combustion engine, the operation of the engine should be stopped when detection of abnormalities in the internal combustion engine is completed, for example.

Of course, it is also possible to adopt, as a condition under which the engine operation mode is selected, a requirement, or lack of requirement, to operate the engine in order to output required drive force (in other words, drive force required as drive force output from the hybrid system), from the hybrid system. In this case, if there is a requirement to operate the engine in order to output required drive force from the hybrid system, then the engine operation mode is selected and operation of the engine is started, whereas if there is no such requirement, then the engine operation stop mode is selected and operation of the engine is stopped.

Moreover, in determining the completion of the release of vaporized fuel, it is possible to use, for example, one or both of whether or not a total amount of vaporized fuel released after the start of release of vaporized fuel has reached a predetermined amount, or whether or not a concentration of vaporized fuel released by the release of vaporized fuel has reached a predetermined concentration. In this case, it is determined that the release of vaporized fuel has been completed when the total amount of vaporized fuel released after the start of release of vaporized fuel has reached a predetermined amount, or when the concentration of vaporized fuel released by the release of vaporized fuel has reached a predetermined concentration, or when the total amount of the vaporized fuel has reached a predetermined amount and the concentration of the vaporized fuel has reached a predetermined concentration.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A control apparatus for a hybrid system that output drive force output by an internal combustion engine and drive force output by an electric motor, and that selectively performs an engine operation mode in which at least the internal combustion engine is operated, and an engine operation stop mode in which operation of the internal combustion engine is stopped, the control apparatus comprising:
   a vaporized-fuel capturing/releasing device that captures vaporized fuel generated inside a fuel tank and releases the captured vaporized fuel: and
   a controller that performs the following control:
   in cases where release of vaporized fuel captured in the vaporized-fuel capturing/releasing device is required, (i) when the internal combustion engine is being operated with an object other than the release of vaporized fuel, starting release of the vaporized fuel if there is no abnormality in the vaporized-fuel capturing/releasing device, and continuing operation of the internal combustion engine to release the vaporized fuel until condition for terminating release of the vaporized fuel is satisfied;
   in cases where release of the vaporized fuel is required, (ii) when the internal combustion engine is not being operated, starting operation of the internal combustion engine and starting release of the vaporized fuel, if there is no abnormality in the vaporized-fuel capturing/releasing device;
   in cases where release of the vaporized fuel is required, (iii) when the internal combustion engine is being operated with the object other than the release of vaporized fuel, prohibiting the release of the vaporized fuel if there is an abnormality in the vaporized-fuel capturing/releasing device; and
   in cases where the release of the vaporized fuel is required, (iv) when the internal combustion engine is not being operated, prohibiting the start of the operation of the internal combustion engine and prohibiting the release of the vaporized fuel, if there is the abnormality in the vaporized-fuel capturing/releasing device.

2. The control apparatus for a hybrid system according to claim 1, wherein the controller prohibits release of the vaporized fuel if there is an abnormality in the vaporized-fuel capturing/releasing apparatus, in cases where release of the vaporized fuel is required.

3. The control apparatus for a hybrid system according to claim 1, wherein the operation of the internal combustion engine is performed in order to protect a drive force transmission system of the internal combustion engine.

4. The control apparatus for a hybrid system according to claim 1, wherein the condition for terminating release of the vaporized fuel is satisfied when a total amount of vaporized fuel released after the start of release of vaporized fuel has reached a predetermined amount, or when a concentration of vaporized fuel released by the release of vaporized fuel has reached a predetermined concentration, or when a total amount of the vaporized fuel has reached a predetermined amount and a concentration of the vaporized fuel has reached a predetermined concentration.

5. A control method for a hybrid system that output drive force output by an internal combustion engine and drive force output by an electric motor, and that selectively performs an engine operation mode in which at least the internal combustion engine is operated, and an engine operation stop mode in which operation of the internal combustion engine is stopped, the control method comprising:
   (i) starting, when the internal combustion engine is being operated with an object other than the release of vaporized fuel, release of vaporized fuel if there is no abnormality in a vaporized-fuel capturing/releasing device that captures vaporized fuel generated inside a fuel tank and releases the captured vaporized fuel, and continuing operation of the internal combustion engine to release the vaporized fuel until condition for terminating release of the vaporized fuel is satisfied, in cases where release of the vaporized fuel captured in the vaporized-fuel capturing/releasing device is required;

(ii) starting, when the internal combustion engine is not being operated, operation of the internal combustion engine and starting release of the vaporized fuel, if there is no abnormality in the vaporized-fuel capturing/releasing device in cases where release of the vaporized fuel is required;

(iii) prohibiting, when the internal combustion engine is being operated with the object other than the release of vaporized fuel, the release of vaporized fuel if there is an abnormality in the vaporized-fuel capturing/releasing device; and (iv) prohibiting the start of the operation of the internal combustion engine, thereby prohibiting the release of the vaporized fuel, if there is the abnormality in the vaporized-fuel capturing/releasing device when the internal combustion engine is not being operated.

* * * * *